(12) United States Patent
Suzuki

(10) Patent No.: US 9,123,090 B2
(45) Date of Patent: Sep. 1, 2015

(54) IMAGE DATA COMPRESSION DEVICE, IMAGE DATA DECOMPRESSION DEVICE, DISPLAY DEVICE, IMAGE PROCESSING SYSTEM, IMAGE DATA COMPRESSION METHOD, AND IMAGE DATA DECOMPRESSION METHOD

(71) Applicant: SEIKO EPSON CORPORATION, Tokyo (JP)

(72) Inventor: Naoki Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 159 days.

(21) Appl. No.: 14/042,060

(22) Filed: Sep. 30, 2013

(65) Prior Publication Data

US 2014/0099025 A1    Apr. 10, 2014

(30) Foreign Application Priority Data

Oct. 4, 2012    (JP) ................ 2012-221943

(51) Int. Cl.
| | |
|---|---|
| *G06K 9/00* | (2006.01) |
| *G06K 9/36* | (2006.01) |
| *G06T 9/00* | (2006.01) |
| *H04N 19/597* | (2014.01) |
| *H04N 19/46* | (2014.01) |
| *H04N 19/593* | (2014.01) |
| *H04N 19/184* | (2014.01) |
| *H04N 19/90* | (2014.01) |

(52) U.S. Cl.
CPC .............. *G06T 9/00* (2013.01); *H04N 19/184* (2014.11); *H04N 19/46* (2014.11); *H04N 19/593* (2014.11); *H04N 19/597* (2014.11); *H04N 19/90* (2014.11)

(58) Field of Classification Search
None
See application file for complete search history.

(56) References Cited

U.S. PATENT DOCUMENTS

| | | | | |
|---|---|---|---|---|
| 2010/0098333 | A1* | 4/2010 | Aoyagi | 382/166 |
| 2011/0292185 | A1* | 12/2011 | Takenaka | 348/51 |
| 2013/0286160 | A1* | 10/2013 | Sasaki et al. | 348/43 |
| 2014/0056577 | A1* | 2/2014 | Ogawa et al. | 386/329 |

FOREIGN PATENT DOCUMENTS

| | | |
|---|---|---|
| JP | 2002-354270 A | 12/2002 |
| JP | 2012-134847 A | 12/2012 |

\* cited by examiner

*Primary Examiner* — Phuoc Tran
(74) *Attorney, Agent, or Firm* — Maschoff Brennan

(57) ABSTRACT

A compression and decompression module provided in a display device includes: a comparison unit that, when first image data and second image data in which a gradation value of each of a plurality of pixels is expressed in m bits are input, compares gradation values of corresponding pixels of the input first and second image data; a compression unit that compresses the second image data and that, when values of predetermined n bits (where n≤m) of the gradation values match each other in a comparison result of the comparison unit, generates compressed data including identification data indicating that the values of the n bits match each other; and a control unit that performs control to output data, which indicates the gradation value of the corresponding pixel of the first image data, and the compressed data generated by the compression unit so as to correspond to each other.

12 Claims, 9 Drawing Sheets

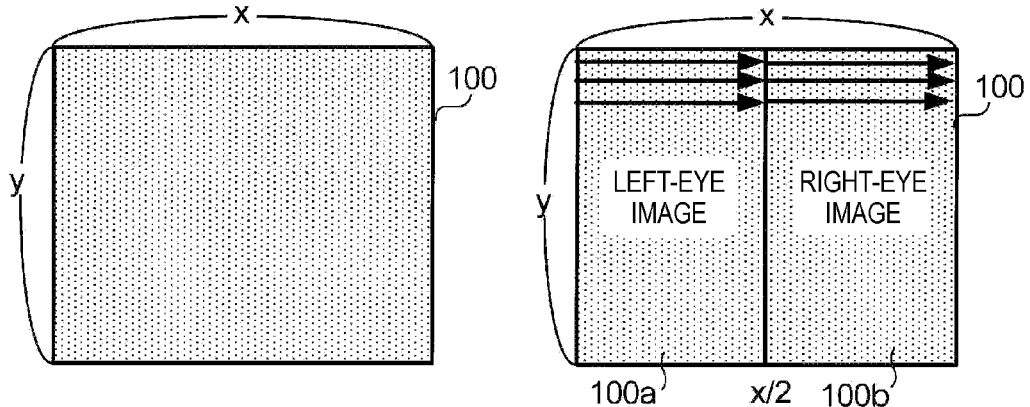

FIG. 3A    FIG. 3B

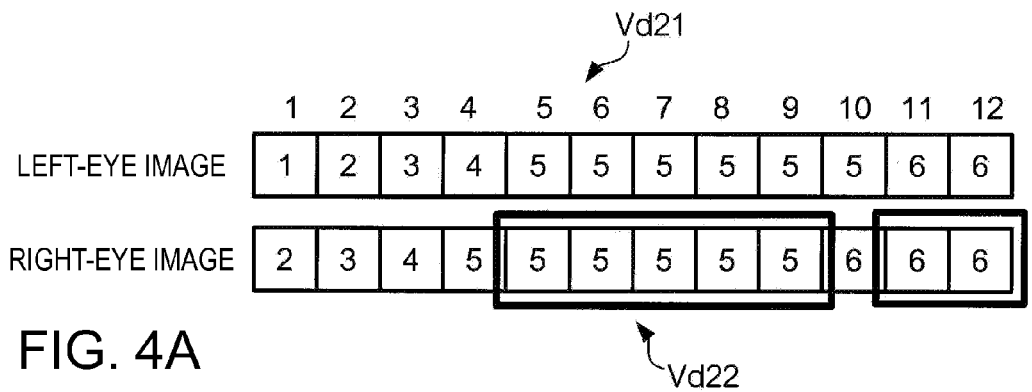

FIG. 4A

DATA FORMAT OF IMAGE DATA Vd22a

| | | |
|---|---|---|
| FIRST PIXEL | (0,2) | (IDENTIFICATION DATA, GRADATION VALUE) |
| SECOND PIXEL | (0,3) | (IDENTIFICATION DATA, GRADATION VALUE) |
| THIRD PIXEL | (0,4) | (IDENTIFICATION DATA, GRADATION VALUE) |
| FOURTH PIXEL | (0,5) | (IDENTIFICATION DATA, GRADATION VALUE) |
| FIFTH TO NINTH PIXELS | (1,5) | (IDENTIFICATION DATA, THE NUMBER OF CONTINUOUS PIXELS) |
| TENTH PIXEL | (0,6) | (IDENTIFICATION DATA, GRADATION VALUE) |
| ELEVENTH AND TWELFTH PIXELS | (1,2) | (IDENTIFICATION DATA, THE NUMBER OF CONTINUOUS PIXELS) |

THE AMOUNT OF DATA CHANGES WITH LINE

FIG. 4B

DATA FORMAT OF IMAGE DATA Vd22a

HIGH-ORDER 8 BITS   1   (IDENTIFICATION DATA)
NINTH BIT           0   (GRADATION VALUE)
TENTH BIT           0   (GRADATION VALUE)

IMAGE DATA COMPRESSION DEVICE, IMAGE DATA DECOMPRESSION DEVICE, DISPLAY DEVICE, IMAGE PROCESSING SYSTEM, IMAGE DATA COMPRESSION METHOD, AND IMAGE DATA DECOMPRESSION METHOD

The entire disclosure of Japanese Patent Application No. 2012-221943, filed Oct. 4, 2012 is expressly incorporated by reference herein.

BACKGROUND

1. Technical Field

The present invention relates to a technique for compressing or decompressing image data.

2. Related Art

There is a technique for reducing the amount of data transmission by compressing image data showing a still image or a moving image. JP-A-2012-134847 discloses a technique of performing compression processing using the same compression algorithm for the entire image signal. JP-A-2002-354270 discloses a technique of comparing the data of a plurality of lines after compressing still image data in units of a line and transmitting only the header when the lines of the same data appear to overlap each other.

The invention disclosed in JP-A-2012-134847 is for compressing the entire image signal according to the same compression algorithm. Accordingly, it may be difficult to increase the compression rate efficiently. The invention disclosed in JP-A-2002-354270 is for comparing a plurality of lines after compressing still image data using a run-length compression method or the like and determines which of the still image data after line-unit compression and the header is to be transmitted. Therefore, in the invention disclosed in JP-A-2002-354270, compression processing of the still image data is not performed according to the matching of data of a plurality of lines.

SUMMARY

An advantage of some aspects of the invention is to provide a technique for compressing or decompressing image data using a method based on the matching of gradation values in a plurality of pieces of image data.

An image data compression device according to an aspect of the invention includes: a comparison unit that, when first image data and second image data in which a gradation value of each of a plurality of pixels is expressed in m bits are input, compares gradation values of corresponding pixels of the input first image data and second image data; a compression unit that compresses the second image data and that, when values of predetermined n bits (where n≤m) of the gradation values match each other in a comparison result of the comparison unit, generates compressed data including identification data indicating that the values of the n bits match each other; and a control unit that performs control to output data, which indicates the gradation value of the corresponding pixel of the first image data, and the compressed data generated by the compression unit so as to correspond to each other.

According to the aspect of the invention, the gradation values of corresponding pixels in the first image data and the second image data are compared, and when the values of predetermined n bits match each other, compressed data including the identification data indicating that the values match each other is generated. Therefore, it is possible to compress the image data using a method based on the matching of the gradation values in a plurality of pieces of image data.

The image data compression device according to the aspect of the invention may be configured such that, when pixels having the values of the n bits matching between the first image data and the second image data continue, the compression unit generates the compressed data including the identification data and the number of pixels by which the pixels continue.

With this configuration, it is possible to generate compressed data including the number of continuous pixels whose values of n bits match between the first image data and the second image data.

The image data compression device according to the aspect of the invention may be configured such that, when m>n, the compression unit generates the compressed data including the identification data and values other than the n bits of the gradation value of the corresponding pixel of the second image data.

With this configuration, even if the gradation values of corresponding pixels in the first image data and the second image data do not completely match each other, it is possible to compress the second image data.

The image data compression device according to the aspect of the invention may be configured such that the control unit detects movement of an image expressed by the first image data and the second image data and change the corresponding pixels of the first image data and the second image data according to the detected movement.

With this configuration, since the number of pixels whose values of n bits match each other can be increased, it is possible to increase the compression rate.

An image data decompression device according to another aspect of the invention includes: a first memory that stores first image data indicating a gradation value of each of a plurality of pixels; a second memory that stores second image data after compression that indicates a gradation value of each of a plurality of pixels and that, for a pixel whose values of predetermined n bits match a gradation value of a corresponding pixel of the first image data, includes identification data indicating that the values of the n bits match each other; and a decompression unit that reads the first image data from the first memory and reads the second image data from the second memory and decompresses the second image data and that outputs an m-bit (where m≥n) gradation value using the values of the n bits of the corresponding pixel of the read first image data when the identification data is read.

According to this aspect of the invention, when the identification data indicating that the values of predetermined n bits match each other is stored in a memory, the gradation value of the second image data is output using the values of n bits of the gradation value of the corresponding pixel in the first image data. Therefore, it is possible to decompress the image data using a method based on the matching of the gradation values in a plurality of pieces of image data.

The image data decompression device according to the aspect of the invention may be configured such that, when compressed data including the identification data and the number of pixels by which pixels having the values of the n bits matching between the first image data and the second image data continue is read, the decompression unit outputs gradation values of pixels of the number of pixels in m bits using the gradation value of the corresponding pixel of the first image data.

With this configuration, on the basis of the compressed data including the number of continuous pixels having the same gradation value in the first image data and the second image data, the second image data can be decompressed using the values of n bits in the gradation value of the first image data.

The image data decompression device according to the aspect of the invention may be configured such that, assuming that m>n, when compressed data including the identification data and values of (m−n) bits is read, the decompression unit outputs an m-bit gradation value using the values of the n bits of the corresponding pixel of the first image data and the values of the (m−n) bits included in the compressed data.

With this configuration, even if the gradation values of corresponding pixels in the first image data and the second image data do not completely match each other, the second image data can be decompressed using the values of n bits in the gradation value of the first image data.

A display device according to still another aspect of the invention includes: a first memory that stores first image data indicating a gradation value of each of a plurality of pixels; a second memory that stores second image data after compression that indicates a gradation value of each of a plurality of pixels and that, for a pixel whose values of predetermined n bits match a gradation value of a corresponding pixel of the first image data, includes identification data indicating that the values of the n bits match each other; a decompression unit that reads the first image data from the first memory and reads the second image data from the second memory and decompresses the second image data and that outputs an m-bit (where m≥n) gradation value using the values of the n bits of the corresponding pixel of the read first image data when the identification data is read; and a display unit that displays an image according to the gradation value of each of the pixels expressed by the first image data and the second image data and the gradation value of the second image data decompressed by the decompression unit.

According to this aspect of the invention, when the identification data indicating that the values of predetermined n bits match each other is stored in a memory, the gradation value of the second image data is output using the values of n bits of the gradation value of the corresponding pixel in the first image data. Therefore, it is possible to decompress the image data using a method based on the matching of the gradation values in a plurality of pieces of image data.

An image processing system according to yet another aspect of the invention includes: a comparison unit that, when first image data and second image data in which a gradation value of each of a plurality of pixels is expressed in m bits are input, compares gradation values of corresponding pixels of the input first image data and second image data; a compression unit that compresses the second image data and that, when values of predetermined n bits (where n≥m) of the gradation values match each other in a comparison result of the comparison unit, generates compressed data including identification data indicating that the values of the n bits match each other; a control unit that performs control to output data, which indicates the gradation value of the corresponding pixel of the first image data, and the compressed data generated by the compression unit so as to correspond to each other; a first memory that stores first image data including the data indicating the gradation value output from the control unit; a second memory that stores second image data that is second image data after compression by the compression unit and includes the compressed data output from the control unit; and a decompression unit that reads the first image data from the first memory and reads the second image data after compression from the second memory and decompresses the second image data after compression and that outputs an m-bit gradation value using the values of the n bits of the corresponding pixel of the read first image data when the identification data included in the compressed data is read.

According to this aspect of the invention, the gradation values of corresponding pixels in the first image data and the second image data are compared, and when the values of predetermined n bits match each other, compressed data including the identification data indicating that the values match each other is generated. Therefore, it is possible to compress the image data using a method based on the matching of the gradation values in a plurality of pieces of image data.

The image processing system according to the aspect of the invention may be configured such that the image processing system further includes a data amount storage unit that, when the comparison unit compares the values of the n bits in units of a partial region of an image expressed by the first image data and the second image data, stores the amount of the compressed data for each partial region, and the decompression unit decompresses the second image data after compression for each partial region on the basis of the amount of data stored in the data amount storage unit.

With this configuration, even if the amount of data changes with a partial region after compression, it is possible to read the image data corresponding to each partial region from the memory.

An image data compression method according to still yet another aspect of the invention includes: when first image data and second image data in which a gradation value of each of a plurality of pixels is expressed in m bits are input, comparing gradation values of corresponding pixels of the input first image data and second image data; compressing the second image data and, when values of predetermined n bits (where n≤m) of the gradation values match each other in a comparison result, generating compressed data including identification data indicating that the values of the n bits match each other; and performing control to output data, which indicates the gradation value of the corresponding pixel of the first image data, and the generated compressed data so as to correspond to each other.

According to this aspect of the invention, the gradation values of corresponding pixels in the first image data and the second image data are compared, and when the values of predetermined n bits match each other, compressed data including the identification data indicating that the values match each other is generated. Therefore, it is possible to compress the image data using a method based on the matching of the gradation values in a plurality of pieces of image data.

An image data decompression method according to further another aspect of the invention includes: reading, from a first memory that stores first image data indicating a gradation value of each of a plurality of pixels, the first image data; reading second image data from a second memory that stores the second image data after compression that indicates a gradation value of each of a plurality of pixels and that, for a pixel whose values of predetermined n bits match a gradation value of a corresponding pixel of the first image data, includes identification data indicating that the values of the n bits match each other; and decompressing the second image data and outputting an m-bit (where m≥n) gradation value using the values of the n bits of the corresponding pixel of the read first image data when the identification data is read.

According to this aspect of the invention, when the identification data indicating that the values of predetermined n bits match each other is stored in a memory, the gradation value of the second image data is output using the values of n bits of the gradation value of the corresponding pixel in the first image data. Therefore, it is possible to decompress the image data using a method based on the matching of the gradation values in a plurality of pieces of image data.

BRIEF DESCRIPTION OF THE DRAWINGS

The invention will be described with reference to the accompanying drawings, wherein like numbers reference like elements.

FIGS. 3A and 3B are diagrams for explaining image data in the first embodiment.

FIGS. 4A and 4B are diagrams for explaining compression processing in the first embodiment.

DESCRIPTION OF EXEMPLARY EMBODIMENTS

Hereinafter, embodiments of the invention will be described with reference to the accompanying drawings.

First Embodiment

First, a first embodiment of the invention will be described.

Figure 1:
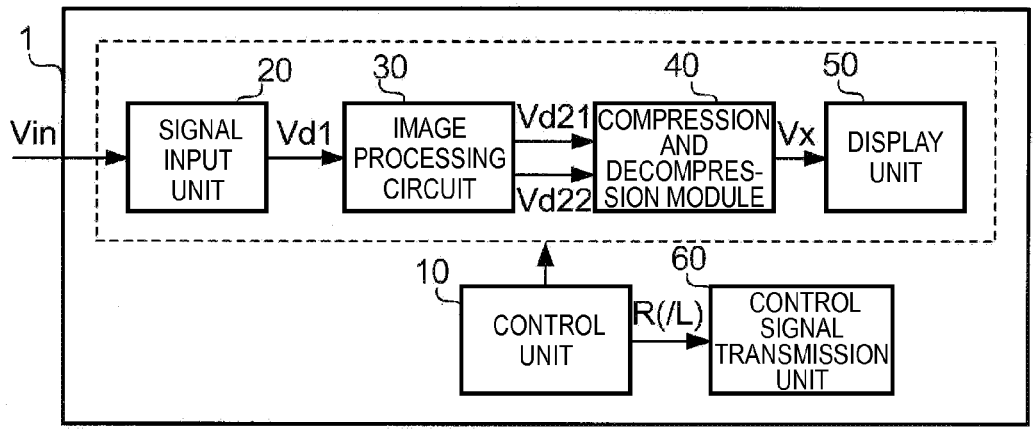
FIG. 1 is a block diagram showing the overall configuration of a display device according to a first embodiment of the invention.

FIG. 1 is a block diagram showing the overall configuration of a display device according to the present embodiment. A display device 1 is an example of a display device for displaying a 3D image so that the user can perceive a 3D image with 3D glasses (not shown). As shown in FIG. 1, the display device 1 includes a control unit 10, a signal input unit 20, an image processing circuit 30, a compression and decompression module 40 (an example of each of an image data compression device and an image data decompression device), and a display unit 50.

The control unit 10 is a control circuit that controls each unit of the display device 1 in synchronization with a vertical scanning signal, a horizontal scanning signal, and a dot clock signal that are supplied from a high-level apparatus.

The signal input unit 20 receives an input of image data Vin from the high-level apparatus (for example, a video reproduction apparatus or a personal computer; not shown) and outputs data according to the input image data Vin. Here, the image data Vin input from the external apparatus is an analog signal. The signal input unit 20 converts the input image data Vin into image data Vd1, which is a digital signal, and outputs the image data Vd1 to the image processing circuit 30. The image data Vd1 is data indicating the gradation values of three color components (R, G, and B) for each of a plurality of pixels. Here, the image data Vd1 is data indicating the gradation values of a plurality of pixels for each frame. An image of each frame is formed by the arrangement of pixels in rows and columns. In the present embodiment, the gradation value of each color component is designated as 10 bits (=m bits) in the image data Vd1. Accordingly, in the image data Vd1, image data corresponding to one pixel expresses the gradation values of three color components as 30-bit data.

The image processing circuit 30 performs predetermined image processing (for example, 2D/3D conversion processing, frame interpolation processing, high resolution processing, Keystone correction processing, or color conversion processing) on the image data Vd1 and outputs image data Vd21 and image data Vd22 to the compression and decompression module 40 as image data of two systems. When displaying a 3D image, image data of two systems corresponding to a left-eye image and a right-eye image with parallax is supplied, for example, in a time-division manner. Here, the image data Vd21 is image data (an example of first image data) expressing the left-eye image, and the image data Vd22 is image data (an example of the second image data) expressing the right-eye image. Since the image data Vd21 and the image data Vd22 are image data expressing the left-eye image and the right-eye image with parallax as described above, the image data Vd21 and the image data Vd22 express images having high similarity. Assuming that the format of the image data Vd21 and Vd22 is based on the Side by Side method, the relationship between the left-eye image and the right-eye image is that the left-eye image and the right-eye image are shifted from each other in a row direction by one or a plurality of pixels.

The compression and decompression module 40 compresses the image data Vd22 using the image data Vd21 and Vd22 of two systems and then transmits these pieces of image data and outputs image data Vx to the display unit 50. The configuration of the compression and decompression module 40 will be described later.

The display unit 50 is a display unit that has, for example, a transmissive liquid crystal panel and has a plurality of pixels arrayed in a matrix. In the liquid crystal panel, liquid crystal is sealed between a pair of transparent electrodes. One of the pair of transparent electrodes is divided into a plurality of pixels arrayed in a two-dimensional manner in a matrix. Liquid crystal of each pixel shows the optical characteristics (for example, a transmittance) according to the voltage applied between the transparent electrodes. In the display unit 50, incident light can be modulated for each pixel by controlling the voltage applied to each pixel.

A control signal transmission unit 60 transmits a control signal R (/L) supplied from the control unit 10 to the 3D glasses, for example, by infrared communication. The control signal R (/L) is a control signal indicating the display period of the right-eye image or the display period of the left-eye image when displaying the 3D image. The 3D glasses control each of a liquid crystal shutter of a lens unit for a right eye and a liquid crystal shutter of a lens unit for a left eye so as to have a transmission state or a non-transmission state according to the received control signal R (/L). The specific configuration or the driving method of the 3D glasses is not particularly limited in the invention.

Figure 2:
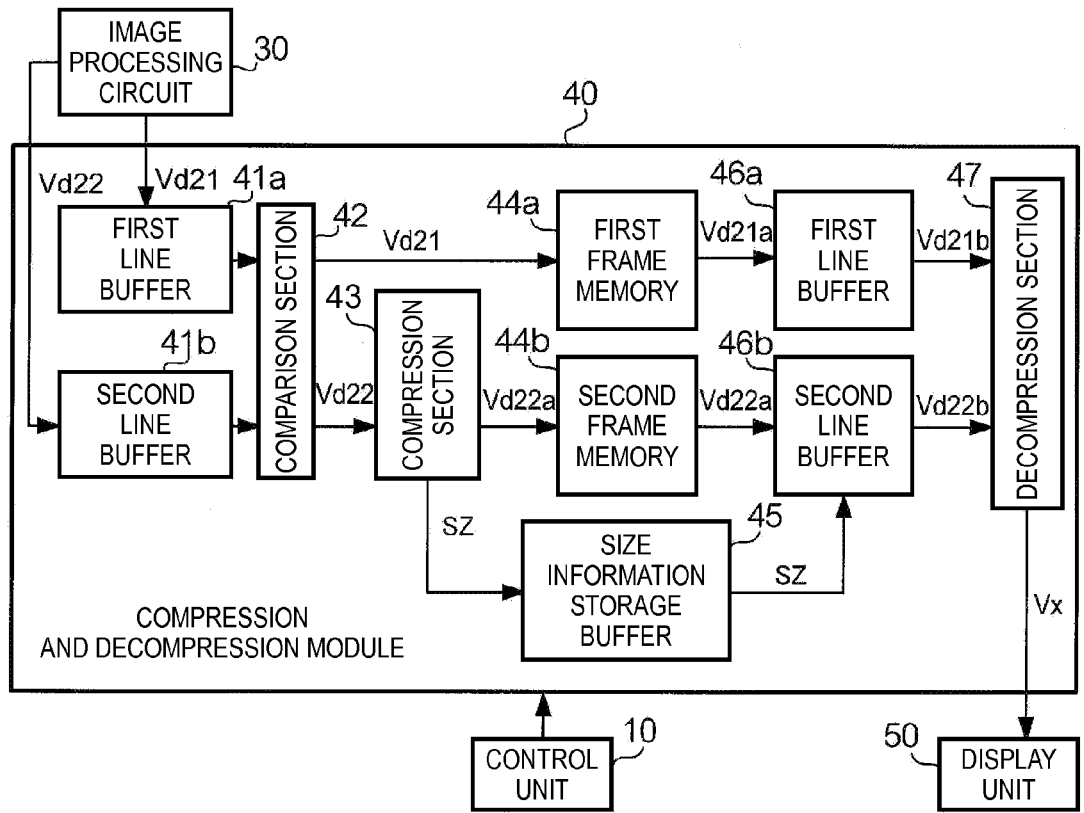
FIG. 2 is a block diagram showing the configuration of a compression and decompression module in the first embodiment.

FIG. 2 is a block diagram showing the configuration of the compression and decompression module 40. The compression and decompression module 40 includes a first line buffer 41a, a second line buffer 41b, a comparison section 42, a compression section 43, a first frame memory 44a, a second frame memory 44b, a size information storage buffer 45, a first line buffer 46a, a second line buffer 46b, and a decompression section 47. The control unit 10 performs processing of reading data from each line buffer or each frame memory provided in the compression and decompression module 40 or processing of storing data in each line buffer or each frame memory.

Each buffer provided in the compression and decompression module 40 is a First In First Out (FIFO) memory in the present embodiment.

The first and second line buffers 41a and 41b are buffer memories for storing the image data of one row (that is, one line) in the image data Vd1. The first line buffer 41a stores the gradation value of each pixel expressed by the image data Vd21 input from the image processing circuit 30. The second line buffer 41b stores the gradation value of each pixel expressed by the image data Vd22 input from the image processing circuit 30. Here, the image of one frame is assumed to be an image obtained by arraying x pixels in the row direction and y pixels in the column direction in a two-dimensional manner as shown in FIG. 3A. In this case, assuming that the format of the image data Vd21 and Vd22 for 3D display is based on the Side by Side method, it is preferable that each of the first and second line buffers 41a and 41b have at least a capacity for storing the gradation values of pixels of the half of one line (that is, a half line) in the image data Vd1.

As shown in FIG. 3B, the Side by Side method is a method in which a total of two frames of one frame of image data for displaying the left-eye image 100a and one frame of image data for displaying the right-eye image 100a are compressed to ½ in the row direction and these are disposed side by side in the row direction to create one frame. Therefore, as shown in FIG. 3B, the position of the (x/2)-th pixel from the left in the diagram is a boundary of the left-eye image 100a and the right-eye image 100a.

When the image data Vd21 is input from the first line buffer 41a and the image data Vd22 is input from the second line buffer 41b, the comparison section 42 compares the gradation values of pixels corresponding to the input image data Vd21 and Vd22. Here, for each color component, the comparison section 42 compares a total of 10 (=m) bits of the gradation values of pixels, which are present at the same position, in the image data Vd21 and the image data Vd22. As indicated by the arrow in FIG. 3B, the control unit 10 reads the gradation values of pixels in each line sequentially from the first and second line buffers 41a and 41b, and makes the comparison section 42 compare the gradation values. Then, the comparison section 42 compares the gradation values of pixels, which are present on the same line and present at the same position in the row direction (that is, read timing is the same), in the left-eye image 100a and the right-eye image 100a. The comparison section 42 outputs the image data Vd21 to the first frame memory 44a and also outputs a comparison result, which indicates whether the gradation values of both pixels match each other, and the image data Vd22 to the compression section 43.

The compression section 43 compresses the image data Vd22 to generate image data Vd22a and outputs the image data Vd22a. Specifically, when the compared gradation values (gradation values of all color components) of pixels match each other in the comparison result of the comparison section 42, the compression section 43 sets the value of identification data Q, which indicates that the gradation values of compared pixels match each other, to "1" and outputs it to the second frame memory 44b. When the value of the identification data Q is output as "1", the compression section 43 does not output the gradation values of the compared pixels of the image data Vd22 to the second frame memory 44b. Thus, the compression section 43 generates and outputs compressed data including the identification data Q whose value is "1".

On the other hand, when the gradation values of the compared pixels do not match each other, the compression section 43 outputs the value of the identification data Q as "0" and also outputs the gradation values of the compared pixels of the image data Vd22 to the second frame memory 44b as they are (that is, m=10 bits for each color component). For example, the compression section 43 sets "0", which is the value of the identification data Q, as a header and outputs gradation values subsequent thereto.

In addition, the compression section 43 outputs size information SZ, which indicates the amount of data of each line in the image data Vd22a, to the size information storage buffer 45. As described above, when the gradation values of the compared pixels do not match each other, the compression section 43 outputs 1-bit identification data Q (=0) and the gradation value of 30 bits. On the other hand, when the gradation values of the compared pixels match each other, the compression section 43 outputs 1-bit identification data Q (=1). Thus, the amount of data output from the compression section 43 corresponding to one pixel changes with matching/non-matching of the gradation values of the compared pixels. In addition, the compression section 43 outputs data similarly for each of a plurality of pixels that form one line. Accordingly, the compression section 43 outputs the size information SZ corresponding to each line so that it can be identified that the data stored in the second frame memory 44b is data corresponding to which line (burst length for each line).

The first frame memory 44a (an example of a first memory) and the second frame memory 44b (an example of a second memory) are frame memories for storing the image data of one frame. The first frame memory 44a is a frame memory for storing the image data Vd21 output from the comparison section 42. The second frame memory 44b is a frame memory for storing the image data Vd22a including the gradation values and the compressed data output from the compression section 43.

The size information storage buffer 45 (an example of a data amount storage section) is a buffer memory for storing the size information SZ output from the compression section 43.

Each of the first and second line buffers 46a and 46b is a line buffer memory for storing the image data of one line. The first line buffer 46a is a line buffer memory for storing the image data Vd21a transmitted from the first frame memory 44a for each line. The second line buffer 46b is a line buffer memory for storing the image data Vd22a, which is transmitted from the second frame memory 44b for each line, and the size information SZ, which is transmitted from the size information storage buffer 45, so as to match each other.

The decompression section 47 decompresses image data Vd22b after compression, which is read from the second line buffer 46b for each line, on the basis of the size information SZ. The decompression section 47 outputs the image data of one line alternately from the first and second line buffers 46a and 46b. Meanwhile, when "1" is input as the identification data Q from the second line buffer 46b, the decompression section 47 outputs a gradation value of m (=10) bits for each color component using the gradation value of the corresponding pixel of image data Vd21b. When the identification data Q is "1", the gradation values of pixels present at the same position in the image data Vd21b and the image data Vd22b are the same. Accordingly, the decompression section 47 decompresses the image data Vd22b using the image data Vd21b.

FIGS. 4A and 4B are diagrams for explaining the compression processing in the compression and decompression module 40. Squares shown in FIG. 4A indicate pixels at the same position in the same line for the image data Vd21 and the image data Vd22, and pixel numbers of "1" to "12" will be given in order from the left for the sake of explanation. Here, the gradation values of pixels of the left-eye image 100a are "1", "2", "3", "4", "5", "5", "5", "5", "5", "5", "6", "6" in order from the left, and the gradation values of pixels of the right-eye image 100b are "2", "3", "4", "5", "5", "5", "5", "5", "5", "6", "6", "6" in order from the left. When these are compared, in the image data Vd21 and the image data Vd22, the gradation values of the pixels of "5" to "9", "11", and "12" match each other and the gradation values of the other pixels do not match each other.

When the gradation values of the compared pixels do not match each other, the compression section 43 of the compression and decompression module 40 outputs "0" (1 bit) as the identification data Q and the gradation value (30 bits) of the pixel in the image data Vd22 so as to correspond to each other. In this case, as shown in FIG. 4B, data output from the compression section 43 is expressed in a format of (identification data (Q=0), gradation value). For example, the compression section 43 outputs data (0, 2) for the pixel of the pixel number "1" and outputs data (0, 3) for the pixel of the pixel number "2". On the other hand, when the gradation values of the compared pixels match each other, the compression section 43 outputs "1" (1 bit) as the identification data Q, which indicates that the gradation values match each other, and the number of continuous pixels, by which pixels of the same gradation values continue in the same line, so as to correspond to each other. In this case, the data output from the compression section 43 is expressed in a format of (identification data (Q=1), the number of continuous pixels). For example, the compression section 43 outputs data (1, 5) for the five pixels of the pixel numbers "1" to "5" and outputs the data (1, 2) for the pixels of the pixel numbers "11" and "12". In the case of x=1920, since the number of continuous pixels can be expressed in 11 bits ($2^{11}$=2048>1920), the amount of data required before compression is a total of 12 bits per pixel. As a result, the amount of data of 18 bits (30 bits–12 bits) is reduced. In the example shown in FIG. 4A, the amount of image data Vd21, that is, the amount of image data when there is no compression is 30 bits×12=360 bits. On the other hand, the amount of image data Vd22a after compression is 179 bits (31 bits×5+12 bits×2). Therefore, the amount of data is approximately halved by compression processing.

In addition, in the compression and decompression module 40, when the gradation values of the compared pixels do not match each other, the value of the identification data Q is set to "0" and is made to correspond to the gradation value. In this case, the amount of data is increased rather. However, assuming that the gradation value of image data of one pixel is set to 10 bits for each color component and accordingly 30 bits are set for the three color components, even if the number of bits is increased to 31 bits due to the addition of the identification data Q, the amount of access to the memory is not changed given that 32-bit data is written into the memory under the conditions in which the bus width is 256 bits.

Figure 5:
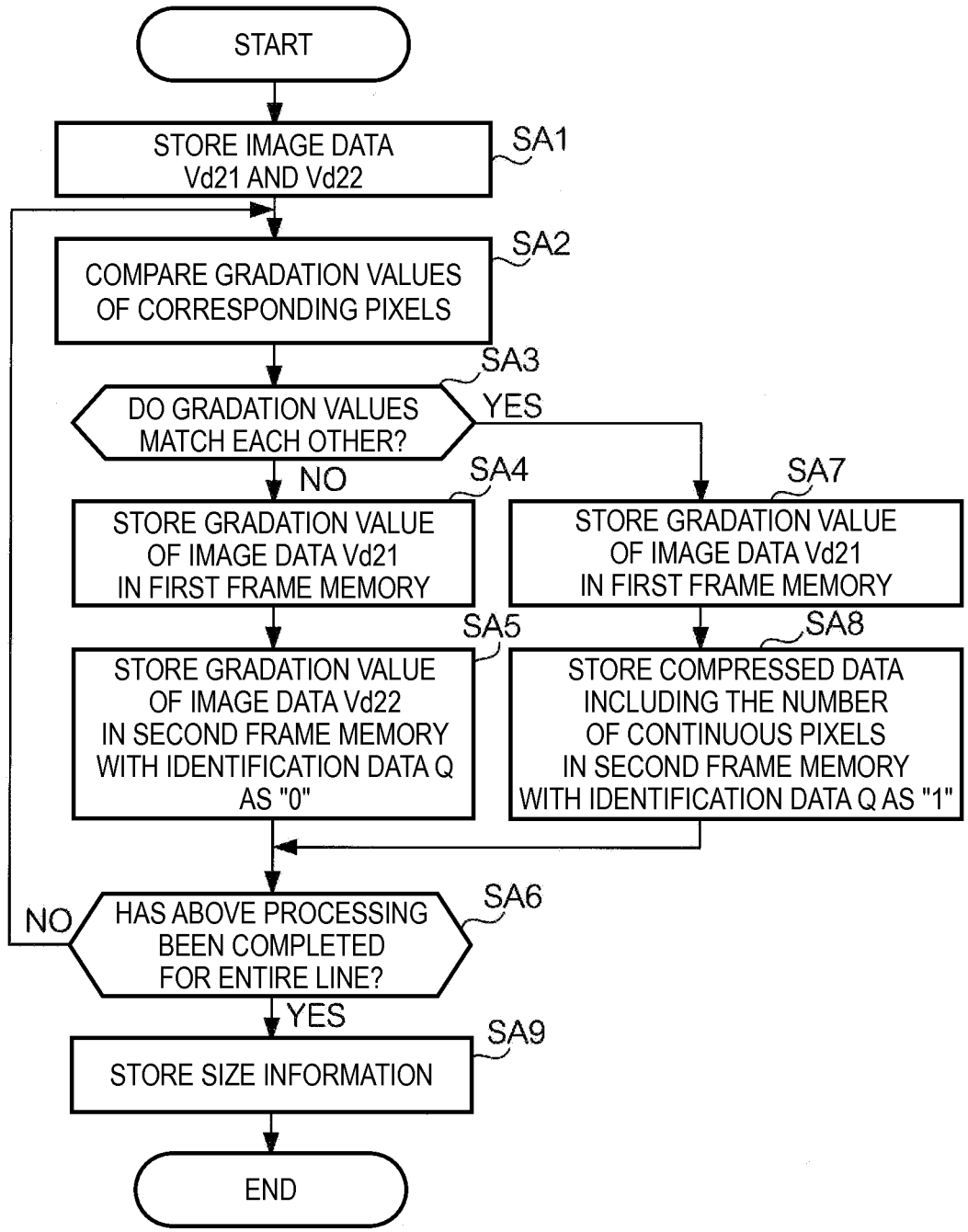
FIG. 5 is a flow chart showing the operation (compression processing) of the display device according to the first embodiment.

FIG. 5 is a flow chart showing the operation of the display device 1 when compressing image data.

The control unit 10 stores the image data Vd21 of one line output from the image processing circuit 30 in the first line buffer 41a, and stores the image data Vd22 of one line output from the image processing circuit 30 in the second line buffer 41b (step SA1). Then, the comparison section 42 compares the gradation values of corresponding pixels in the image data Vd21 read from the first line buffer 41a and the image data Vd22 read from the second line buffer 41b (step SA2). Here, the control unit 10 reads the gradation values of the corresponding pixels in the image data Vd21 and the image data Vd22 at the same timing and supplies the read gradation values to the comparison section 42. The comparison section 42 compares the gradation values of the respective color components of R, G, and B.

Then, the compression section 43 determines whether or not the gradation values of the pixels compared by the comparison section 42 match each other (step SA3). When the gradation values of the compared pixels do not match each other (step SA3; NO), the control unit 10 stores the gradation value of the pixel in the image data Vd21 in the first frame memory 44a (step SA4). Then, on the basis of the output data of the compression section 43, the control unit 10 stores "0" as the identification data Q and the gradation value of the pixel in the image data Vd22 in the second frame memory 44b so as to correspond to each other (step SA5). Then, the control unit 10 determines whether or not the above processing has been completed for the entire line (step SA6). Here, the control unit 10 determines that the above processing has not been completed for the entire line (step SA6; NO), and returns to the process of step SA2.

When the gradation values of the compared pixels match each other (step SA3; YES), the control unit 10 stores the gradation value of the pixel in the image data Vd21 in the first frame memory 44a (step SA7). Then, on the basis of the output data of the compression section 43, the control unit 10 stores "1" as the identification data Q and the number of continuous pixels, by which corresponding pixels of the image data Vd21 and Vd22 continue with the same gradation values (here, continue in the row direction), in the second frame memory 44b so as to correspond to each other (step SA8). Then, the control unit 10 determines whether or not the above processing has been completed for the entire line (step SA6).

When it is determined that the processing has been completed for the entire line (step SA6; YES), the control unit 10 stores the amount of data that forms the line, as the size information SZ, in the size information storage buffer 45 (step SA9).

After the above processing steps are performed for one line, the display device 1 processes all pieces of the image data Vd21 and Vd22 by repeatedly performing the above processing steps while changing the line.

Up to now, the procedure of the compression processing has been described.

Figure 6:
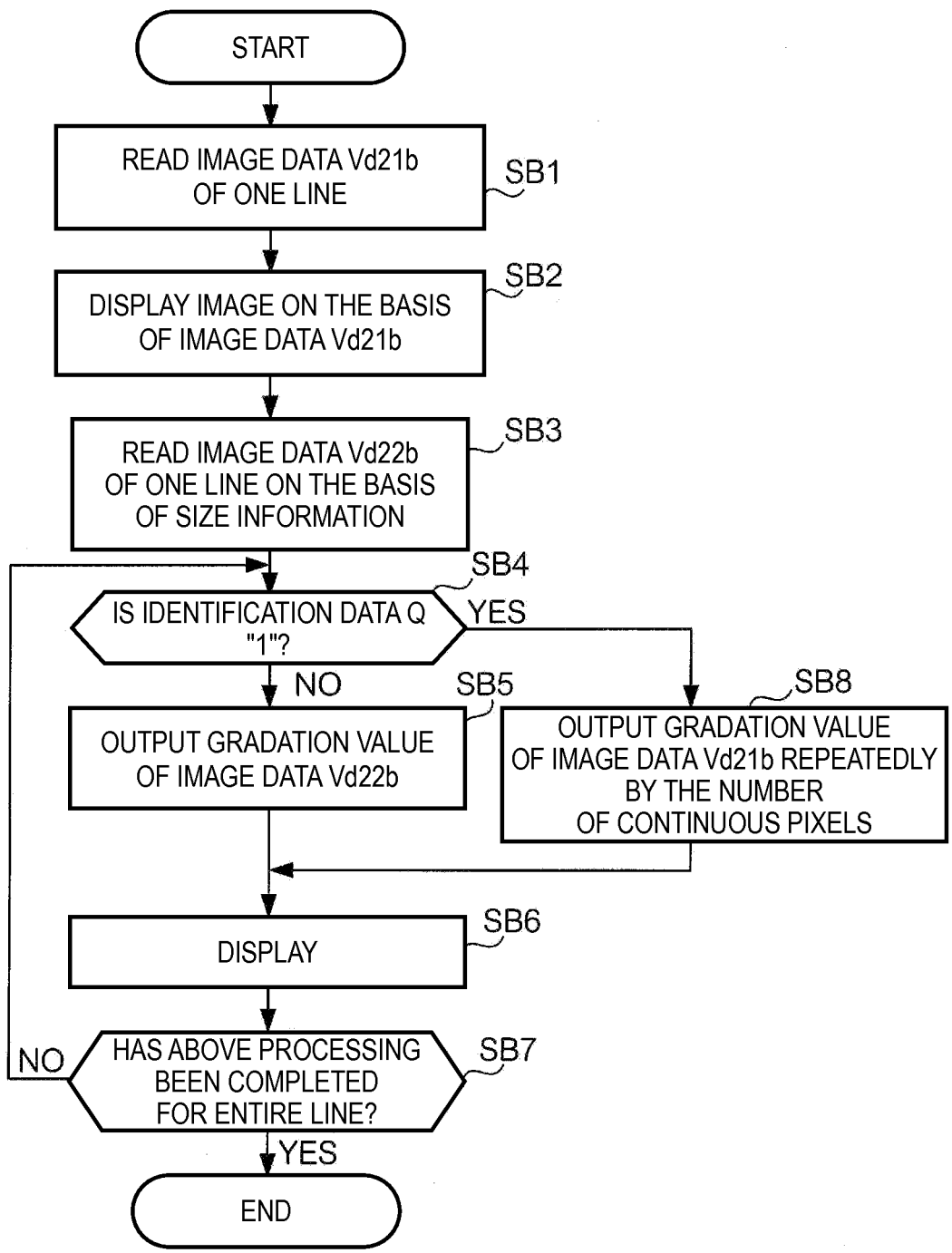
FIG. 6 is a flow chart showing the operation (decompression processing) of the display device according to the first embodiment.

FIG. 6 is a flow chart showing the operation of the display device 1 when decompressing image data.

The decompression section 47 reads the image data Vd21b of one line from the first frame memory 44a through the first line buffer 46a (step SB1). On the basis of the image data Vd21b read by the decompression section 47, the control unit 10 outputs the gradation value of each pixel to the display unit 50 so that the display unit 50 displays the image according to the gradation value (step SB2). Then, the decompression section 47 reads the size information SZ, which is stored in the size information storage buffer 45, through the second line buffer 46b, and reads the image data Vd22b of one line from the second frame memory 44b through the second line buffer 46b on the basis of the read size information SZ (step SB3). Then, the decompression section 47 determines whether or not the value of the identification data Q read from the second frame memory 44b is "1" (step SB4). When it is determined that the value of the identification data Q is not "1", that is, the value of the identification data Q is "0" (step SB4; NO), the decompression section 47 outputs a gradation value corresponding to the identification data Q (step SB5). Then, the control unit 10 outputs the gradation value, which is output from the decompression section 47, to the display unit 50 to display the image (step SB6). Then, the control unit 10 determines whether or not the above processing has been completed for the entire line (step SB7). Here, the control unit 10 determines that the above processing has not been completed for the entire line (step SB7; NO), and returns to the process of step SB4.

When it is determined that the value of the identification data Q is "1" (step SB4; YES), the decompression section 47 repeatedly reads the gradation value of the image data Vd21b by the number of continuous pixels (step SB8). Then, the control unit 10 outputs the gradation value, which is read by the decompression section 47, to the display unit 50 to display the image (step SB6). Then, the control unit 10 determines whether or not the above processing has been completed for the entire line (step SB7). When it is determined that the above processing has been completed for the entire line (step SB7; YES), the control unit 10 ends the decompression process.

After the above processing steps are performed for one line, the display device 1 repeatedly performs the above processing steps while changing the line. In the display device 1, all pieces of the image data Vd21b and Vd22b are processed, and the image data Vx is output to the display unit 50.

Up to now, the procedure of the decompression processing has been described.

In the display device 1 according to the first embodiment described above, when the gradation values of corresponding pixels in image data of a left-eye image and a right-eye image at the time of 3D display match each other, the image data expressing the right-eye image is compressed using identification data. Therefore, according to the display device 1, since it is possible to compress the image data using a method based on the matching of the gradation values in a plurality of pieces of image data, it is possible to increase the compression rate efficiently when compressing the image data of two systems having high similarity at the time of 3D display. In addition, since the display device 1 compresses image data by performing lossless compression, it is possible to prevent an image obtained by decompression processing from being degraded from the original image.

Second Embodiment

Next, a second embodiment of the invention will be described. In the first embodiment described above, the display device 1 determines whether or not the gradation values of image data of the left-eye image and image data of the right-eye image completely match each other. In contrast, in the present embodiment, predetermined n bits of m bits (where n<m) indicating the gradation value are compared. In addition, it can be said that the relationship of n=m is satisfied in the first embodiment described above.

Since the configuration of the display device 1 according to the present embodiment is the same as that in the first embodiment described above, explanation thereof will be omitted herein. In addition, in the present embodiment, values of high-order n bits (n=8 bits) of m bits (=10 bits) indicating the gradation value of each color component are compared. Although representative processing using the image data of one of the three color components will be described below, it is assumed that the same processing is performed by each color component.

Figures 7A, 7B:
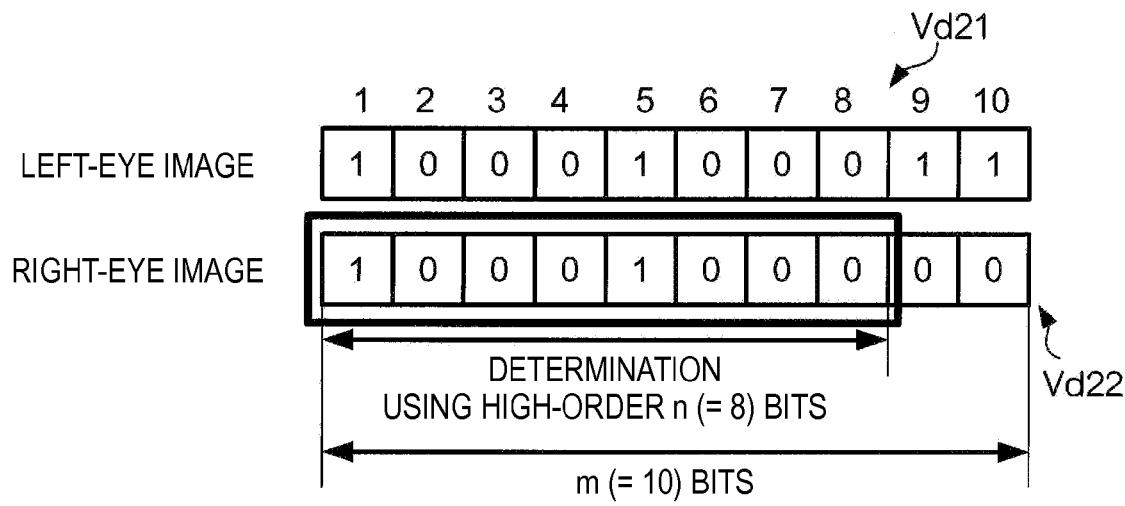
FIGS. 7A and 7B are diagrams for explaining compression processing in a second embodiment of the invention.

FIGS. 7A and 7B are diagrams for explaining the compression processing in the compression and decompression module 40. FIG. 7A shows the same pixel in the same line for the image data Vd21 and the image data Vd22, and pixel numbers of "1" to "10" will be given in order from the highest order for the sake of explanation. Here, the values of m bits of the gradation value in the image data Vd21 are "1", "0", "0", "0", "1", "0", "0", "0", "1", "1" in order from the highest order, and the values of m bits of the gradation value in the image data Vd22 are "1", "0", "0", "0", "1", "0", "0", "0", "0" in order from the highest order. When these are compared, in the image data Vd21 and the image data Vd22, the values of high-order 8 bits (=n bits) match each other, and the values of low-order 2 bits (=m−n bits) do not match each other. Since the values of high-order 8 bits match each other, the gradation values of pixels on both sides do not completely match each other, but many of the pixels show relatively close gradations.

When the values of high-order n bits do not match between the gradation values of the compared pixels, the compression section 43 of the compression and decompression module 40 outputs "0" (1 bit) as the identification data Q, which indicates that the gradation values do not match each other, and the gradation value (30 bits) of the pixel in the image data Vd22 so as to correspond to each other. On the other hand, as shown in FIG. 7B, when the values of high-order n bits match between the gradation values of the compared pixels, the compression section 43 generates and outputs the identification data Q (1 bit), which indicates that the gradation values match each other, and compressed data including the values of low-order (m−n) bits (=2 bits) of the gradation value of the pixel in the image data Vd22. In the example shown in FIGS. 7A and 7B, the value of the identification data Q is "1", and the values of low-order (m−n) bits are "0" (ninth bit from the highest order) and "0" (tenth bit from the highest order). The amount of data of one pixel when there is no compression is 30 bits, while the amount of data of one pixel after compression is a total of 3 bits of 1 bit of the identification data Q and low-order 2 bits. Therefore, 27 bits are compressed for each pixel by the compression processing of the present embodiment.

Figure 8:
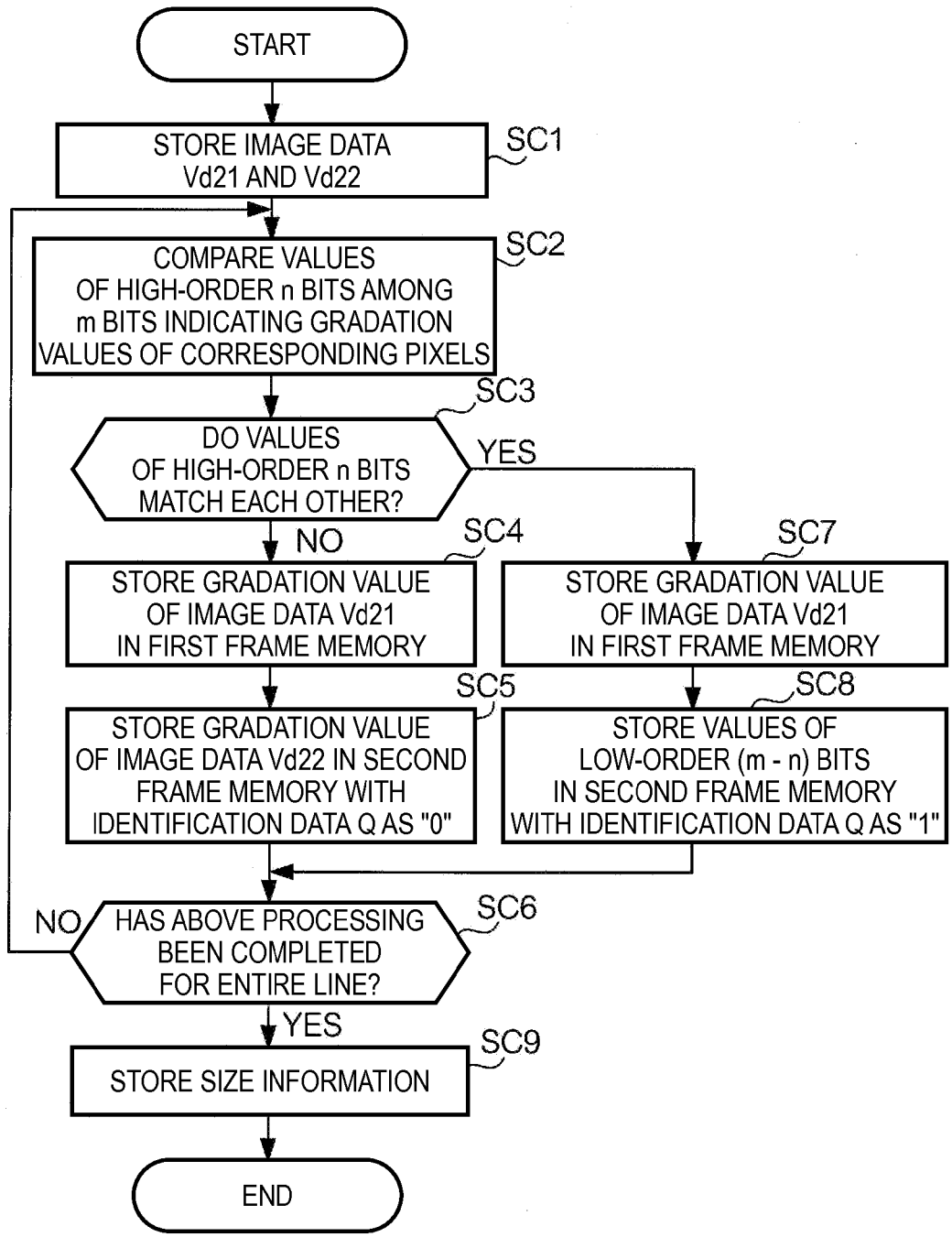
FIG. 8 is a flow chart showing the operation (compression processing) of the display device according to the second embodiment.

FIG. 8 is a flow chart showing the operation of the display device 1 when compressing image data.

The control unit 10 stores the image data Vd21 of one line output from the image processing circuit 30 in the first line buffer 41a, and stores the image data Vd22 of one line output from the image processing circuit 30 in the second line buffer 41b (step SC1). Then, the comparison section 42 compares high-order n bits between the gradation values of corresponding pixels in the image data Vd21 read from the first line buffer 41a and the image data Vd22 read from the second line buffer 41b (step SC2). Here, the control unit 10 reads the gradation values of the corresponding pixels in the image data Vd21 and the image data Vd22 at the same timing and supplies the read gradation values to the comparison section 42.

Then, the compression section 43 determines whether or not the values of high-order n bits, among m bits indicating the gradation values of the pixels compared by the comparison section 42, match each other (step SC3). When the values of the compared high-order n bits do not match each other (step SC3; NO), the control unit 10 stores the m-bit gradation value of the pixel, which is indicated by the image data Vd21, in the first frame memory 44a (step SC4). Then, on the basis of the output data of the compression section 43, the control unit 10 stores "0" as the identification data Q and the gradation value of the compared pixel in the image data Vd22 in the second frame memory 44b so as to correspond to each other (step SC5). Then, the control unit 10 determines whether or not the above processing has been completed for the entire line (step SC6). Here, the control unit 10 determines that the above processing has not been completed for the entire line (step SC6; NO), and returns to the process of step SC2.

When the values of the high-order n bits among the m bits indicating the gradation values of the compared pixels match each other (step SC3; YES), the control unit 10 stores the m-bit gradation value of the pixel, which is indicated by the image data Vd21, in the first frame memory 44a (step SC7). Then, on the basis of the output data of the compression section 43, the control unit 10 stores "1" as the identification data Q and the value of low-order (m−n) bits of the gradation value of the compared pixel in the image data Vd22 in the second frame memory 44b so as to correspond to each other (step SC8). Then, the control unit 10 determines whether or not the above processing has been completed for the entire line (step SC6). When it is determined that the processing has been completed for the entire line (step SC6; YES), the control unit 10 stores the amount of data that forms the line, as the size information SZ, in the size information storage buffer 45 (step SC9).

After the above processing steps are performed for one line, the display device 1 processes all pieces of the image data Vd21 and Vd22 by repeatedly performing the above processing steps while changing the line.

Up to now, the procedure of the compression processing has been described.

Figure 9:
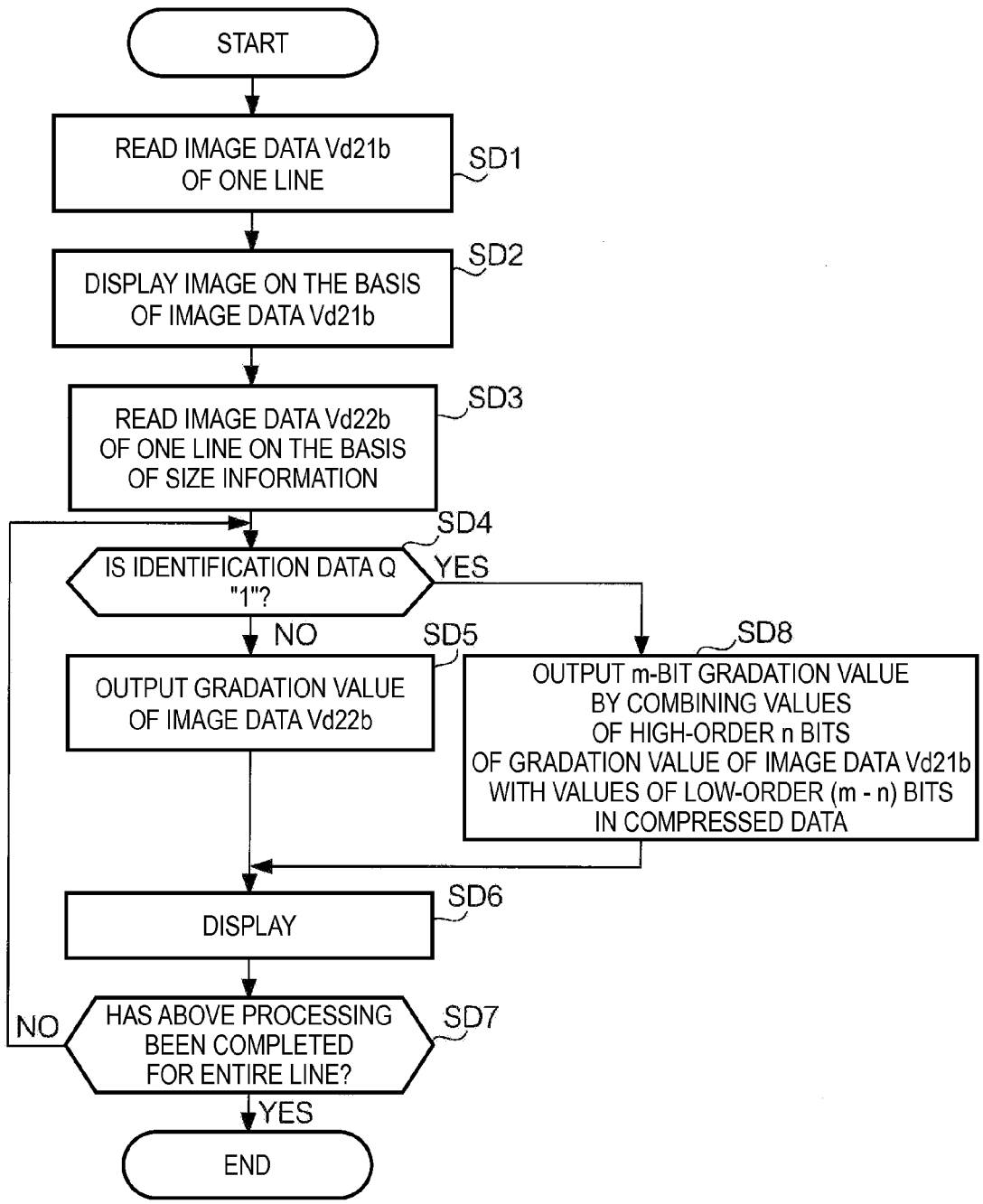
FIG. 9 is a flow chart showing the operation (decompression processing) of the display device according to the second embodiment.

FIG. 9 is a flow chart showing the operation of the display device 1 when decompressing image data.

The decompression section 47 reads the image data Vd21b of one line from the first frame memory 44a through the first line buffer 46a (step SD1). On the basis of the image data Vd21b read by the decompression section 47, the control unit 10 outputs the gradation value of each pixel to the display unit 50 so that the display unit 50 displays the image according to the gradation value (step SD2). Then, the decompression section 47 reads the size information SZ, which is stored in the size information storage buffer 45, through the second line buffer 46b, and reads the image data Vd22b of one line from the second frame memory 44b through the second line buffer 46b on the basis of the read size information SZ (step SD3). Then, the decompression section 47 determines whether or not the value of the identification data Q read from the second frame memory 44b is "1" (step SD4). When it is determined that the value of the identification data Q is not "1", that is, the value of the identification data Q is "0" (step SD4; NO), the decompression section 47 outputs a gradation value corresponding to the identification data Q (step SD5). The control unit 10 outputs the gradation value, which is output from the decompression section 47, to the display unit 50 to display the image (step SD6). Then, the control unit 10 determines whether or not the above processing has been completed for the entire line (step SD7). Here, the control unit 10 determines that the above processing has not been completed for the entire line (step SD7; NO), and returns to the process of step SD4.

When it is determined that the value of the identification data Q is "1" (step SD4; YES), the decompression section 47 outputs an m-bit gradation value obtained by combining the values of high-order n bits of the gradation value of the corresponding pixel in the image data Vd21b with the values of low-order (m−n) bits included in the same compressed data as the identification data Q (step SD8). The control unit 10 outputs the gradation value, which is output from the decompression section 47, to the display unit 50 so that the display unit 50 displays the image according to the gradation value (step SD6). Then, the control unit 10 determines whether or not the above processing has been completed for the entire line (step SD7). When it is determined that the above processing has been completed for the entire line (step SD7; YES), the control unit 10 ends the decompression process.

After the above processing steps are performed for one line, the display device 1 repeatedly performs the above processing steps while changing the line. In the display device 1, all pieces of the image data Vd21b and Vd22b are processed, and the image data Vx is output to the display unit 50.

Up to now, the procedure of the decompression processing has been described.

In the display device 1 according to the second embodiment described above, when the gradation values of corresponding pixels in image data of a left-eye image and a right-eye image at the time of 3D display match each other, the image data is compressed by outputting the identification data instead of the values of high-order n bits for the right-eye image. Therefore, according to the display device 1, it is possible to compress the image data even if the gradation values do not completely match each other. According to the display device 1 of the present embodiment, it is also possible to increase the compression rate efficiently for image data having gradation values that change continuously, such as a gradation image. In addition, according to the display device 1 of the present embodiment, the same effects as in the display device 1 according to the first embodiment described above are obtained.

MODIFICATION EXAMPLES

The invention can be carried out in different forms from the embodiments described above. In addition, modification examples shown below may be appropriately combined.

First Modification Example

Although the display device 1 performs both image data compression processing and image data decompression processing in each of the embodiments described above, a device that compresses image data and a device that decompresses image data may be independent of each other.

Figure 10:
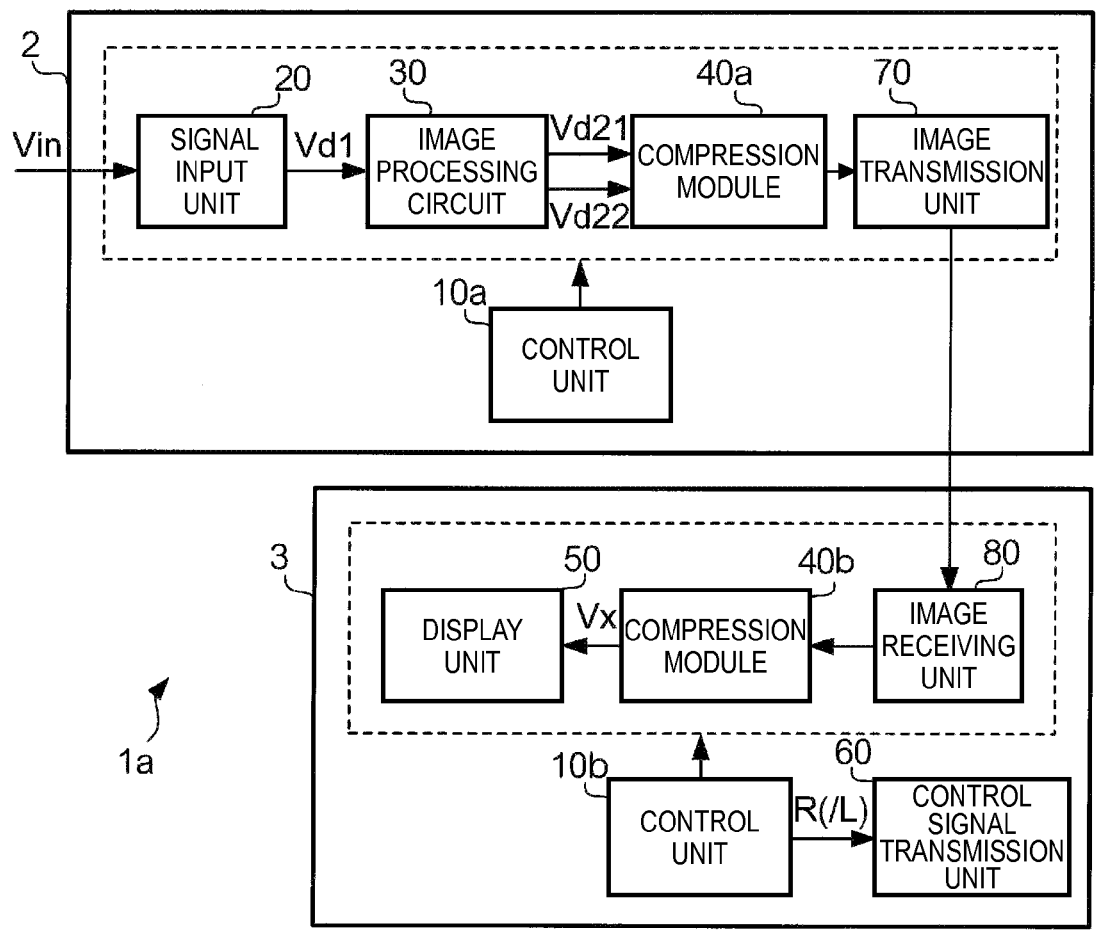
FIG. 10 is a block diagram showing the overall configuration of a display system in a first modification example of the invention.

FIG. 10 is a block diagram showing the overall configuration of a display system 1a (an example of an image processing system) of this modification example. The display system 1a includes a data compression device 2 and a data decompression device 3. The data compression device 2 includes a control unit 10a, a signal input unit 20, an image processing circuit 30, a compression module 40a (an example of an image data compression device), and an image transmission unit 70. The configuration and operation of the signal input unit 20, the image processing circuit 30, and the display unit 50 are the same as those described in each of the above embodiments. The data decompression device 3 includes a control unit 10b, an image receiving unit 80, a decompression module 40b (an example of an image data decompression device), a display unit 50, and a control signal transmission unit 60. The configuration and operation of the display unit 50 and the control signal transmission unit 60 are the same as those described in each of the above embodiments.

Figure 11:
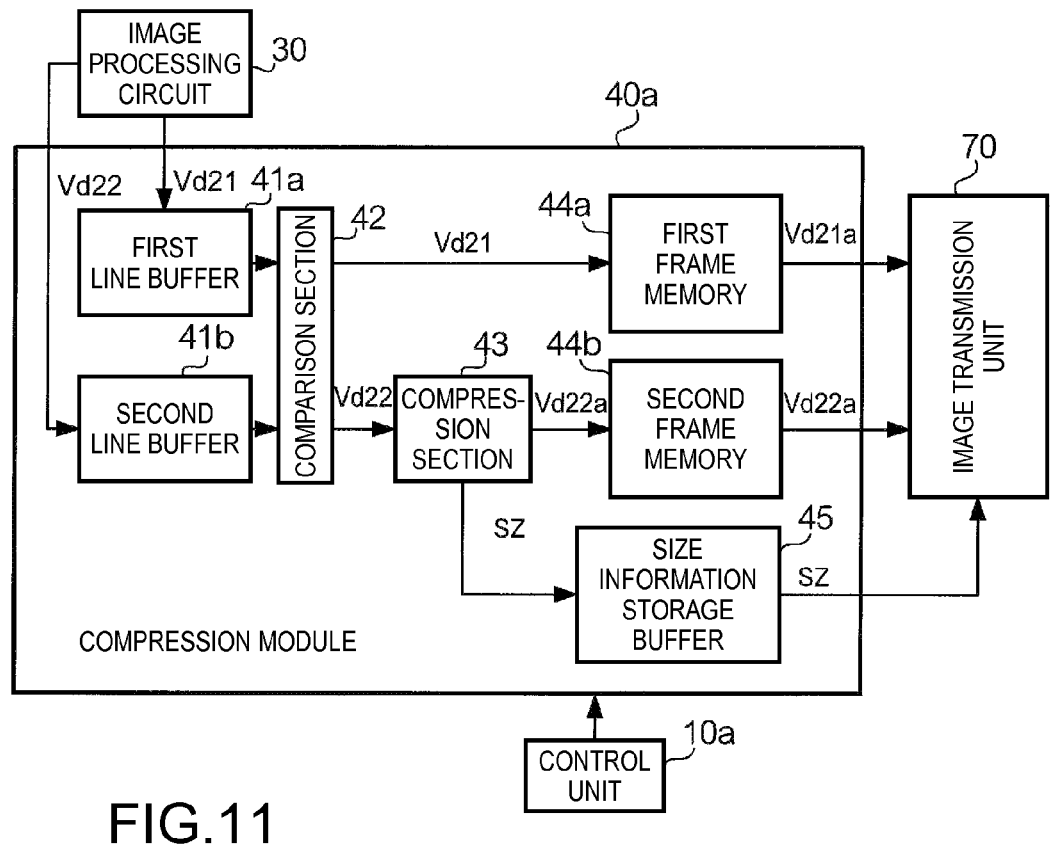
FIG. 11 is a block diagram showing the configuration of a compression module in the first modification example.

First, the configuration of the data compression device 2 will be described. FIG. 11 is a block diagram showing the configuration of the compression module 40a provided in the data compression device 2.

The control unit 10a is a control circuit that controls each unit of the data compression device 2. The control unit 10a realizes a function related to compression processing among the functions of the control unit 10 described in each of the embodiments described above. As shown in FIG. 11, the compression module 40a includes a first line buffer 41a, a second line buffer 41b, a comparison section 42, a compression section 43, a first frame memory 44a, a second frame memory 44b, and a size information storage buffer 45. Since each component provided in the compression module 40a is the same as the component having the same reference numeral in each of the embodiments described above, explanation thereof will be omitted herein. Here, the control unit 10a outputs the image data Vd21a and Vd22a read from the first and second frame memories 44a and 44b to the image transmission unit 70, and outputs the size information SZ read from the size information storage buffer 45 to the image transmission unit 70. The image transmission unit 70 transmits the data output from the compression module 40a (specifically, the image data Vd21a and Vd22a and the size information SZ) to the data decompression device 3.

Figure 12:
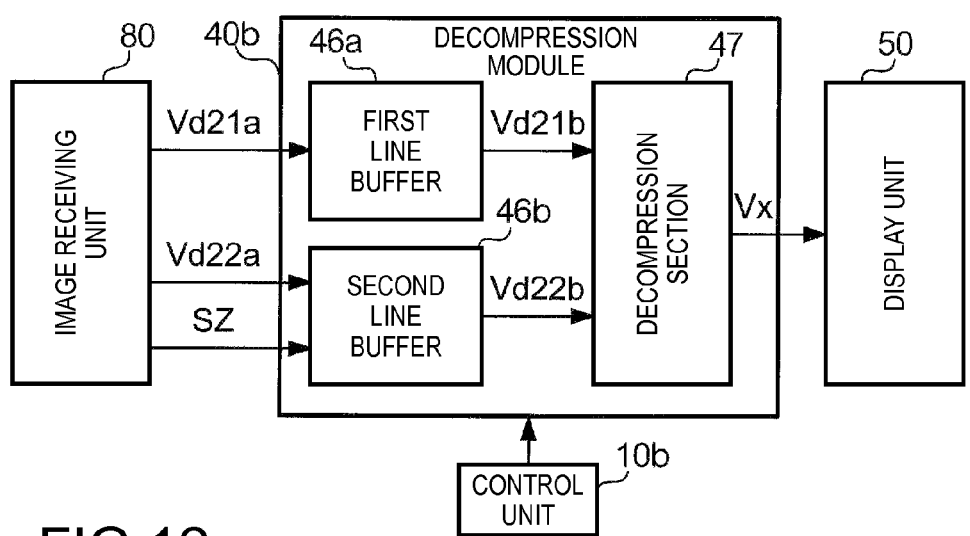
FIG. 12 is a block diagram showing the configuration of a decompression module in the first modification example.

Next, the configuration of the data decompression device 3 will be described. FIG. 12 is a block diagram showing the configuration of the decompression module 40b provided in the data decompression device 3.

The control unit 10b is a control circuit that controls each unit of the data decompression device 3. The control unit 10b realizes a function related to decompression processing among the functions of the control unit 10 described in each of the embodiments described above. As shown in FIG. 12, the decompression module 40b includes a first line buffer 46a, a second line buffer 46b, and a decompression section 47. Since each component provided in the decompression module 40b is the same as the component having the same reference numeral in each of the embodiments described above, explanation thereof will be omitted herein. Here, the control unit 10b outputs the data received by the image receiving unit 80 (specifically, the image data Vd21a and Vd22a and the size information SZ) to the first and second line buffers 46a and 46b.

Also in the display system 1a of the first modification example, the same effects as in each of the embodiments described above are obtained.

Second Modification Example

In the display device 1 according to the second embodiment described above, when pixels for which the values of high-order n bits in the image data Vd21 and Vd22 match each other continue, it is possible to generate compressed data including the identification data Q (="1") and the number of continuous pixels, as in the display device 1 according to the first embodiment described above. In this manner, in the display device 1, it is possible to compress image data with a higher compression rate. In contrast, in the display device 1 according to the first embodiment described above, compressed data may be made not to include the number of continuous pixels by outputting the identification data Q for all pixels, as in the display device 1 according to the second embodiment described above.

Third Modification Example

In each of the embodiments described above, the compression and decompression module 40 compresses image data for each line as a partial region. For example, the compression and decompression module 40 may compress image data for each pixel column that is a group of pixels in the column direction, or may divide partial regions for each block including a plurality of pixels in the row and column directions, or may divide partial regions every plural rows or plural columns. Also in this case, it is preferable that the compression and decompression module 40 store the size information of each partial region in the size information storage buffer 45 and perform decompression processing on the basis of the size information of each partial region stored in the size information storage buffer 45.

Fourth Modification Example

The compression and decompression module 40 may compare the gradation values for some pixels (every other pixel) instead of comparing the gradation values for all pixels indicated by the input image data. In this case, even if the compression and decompression module 40 performs compression processing of replacing the gradation values of some pixels of the image data Vd22 with the identification data Q, the effect of reducing the amount of data is obtained.

Fifth Modification Example

In each of the embodiments described above, the compression and decompression module 40 compresses the image data of the right-eye image without compressing the image data of the left-eye image. However, the compression and decompression module 40 may compress the image data of the left-eye image without compressing the image data of the right-eye image.

In the embodiment of the invention, the format of image data for 3D display may be based on methods other than the Side by Side method. For example, a method called Frame (Field) Sequential to display a left-eye image and a right-eye image alternately in units of a frame or a field may be used, and a method called Top-and-Bottom may be used.

In addition, the invention may also be applied to a device that performs 2D display without being limited to a device that performs 3D display. Also in this case, it is preferable that the compression and decompression module 40 compress one set of image data using two sets of image data.

Sixth Modification Example

In each of the embodiments described above, the display device 1 does not compress the image data Vd21. However, it is possible to compress the image data Vd21 using a known compression algorithm. The display device 1 may compress the image data Vd21 using either lossy compression or lossless compression and output the image data after compression indicating the gradation value of each pixel.

In this case, since the image data Vd22b is decompressed using the image data Vd21b in the display device 1, it is preferable to perform lossless compression for the image data Vd21.

Seventh Modification Example

In the second embodiment described above, m is set to 10 and n is set to 8. However, the values of m and n may be values other than these as long as the relationship of m>n is satisfied. In this case, the values of m and n are values when the amount of image data has been reduced, compared with that before compression processing, by compression processing using the identification data Q. For example, when the value of the identification data Q is expressed in 1 bit, the amount of image data is reduced by compression processing if the value of n is 2 bits or more.

In addition, in the display device 1, it is preferable to compare the values of predetermined n bits set in advance without being limited to the configuration of comparing the values of high-order n bits. In the display device 1, the value of n may be manually set by the user or may be automatically set by the device with reference to image data.

Eighth Modification Example

In each of the embodiments described above, the display device 1 may detect the movement of an image expressed by the image data Vd21 and Vd22 and change a set of pixels to be compared between the image data Vd21 and Vd22 according to the detected movement. As described above, for example, in the case of the Side by Side method, the image data Vd21 and Vd22 is in a relationship in which both image data pieces have moved by one or a plurality of pixels from each other in the row direction. Accordingly, the similarity of both image data pieces is quite high. In this case, if the display device 1 stores the image data Vd21 and Vd22 by shifting one of the timing at which the image data Vd21 is stored in the first line buffer 41a and the timing at which the image data Vd22 is stored in the second line buffer 41b by the amount of movement, the number of pixels whose gradation values match each other in the image data Vd21 and Vd22 is further increased. Thus, according to the display device 1 of this modification example, it is possible to compress image data with a higher compression rate than that in each of the embodiments described above. Even if the format of image data is not based on the Side by Side method, the configuration of this modification can be applied.

Ninth Modification Example

In addition, the image data compression device and the image data decompression device of the embodiment of the invention can also be applied to a computer apparatus or the like, which stores image data that is not for display purposes, without being limited to being applied to the device that displays an image. Thus, the image data compression device and the image data decompression device of the embodiment of the invention can be applied to various apparatuses.

Tenth Modification Example

The display device 1 may correspond to color components other than R, G, and B, or may correspond to a single color component. In addition, the display device 1 is not limited to the display device using the transmissive liquid crystal panel. The display device 1 may be a display device using a reflective liquid crystal panel or may be a display device using an electro-optical element other than liquid crystal, such as an organic electro-luminescence (EL) panel.

Eleventh Modification Example

The detailed configuration of the display device 1 is not limited to that described in FIG. 1 or 2. Some of the components described in FIG. 1 or 2 may be omitted in the display device 1, or a processing unit that is not present in FIG. 1 or 2 may be added to the display device 1, or the order of the processing units may be changed.

Twelfth Modification Example

The display device 1 is not limited to a projector. The display device 1 may be a television set, a view-finder-type or monitor-direct-viewing-type video tape recorder, a car navigation system, a pager, an electronic organizer, a calculator, a word processor, a work station, a video phone, a POS terminal, a digital still camera, a mobile phone, a tablet terminal, or a personal computer.

What is claimed is:

1. An image data compression device, comprising:
    a comparison unit that, when first image data and second image data in which a gradation value of each of a plurality of pixels is expressed in m bits are input, compares gradation values of corresponding pixels of the input first image data and second image data;
    a compression unit that compresses the second image data and that, when values of predetermined n bits (where n≤m) of the gradation values match each other in a comparison result of the comparison unit, generates compressed data including identification data indicating that the values of the n bits match each other; and
    a control unit that performs control to output data, which indicates the gradation value of the corresponding pixel of the first image data, and the compressed data generated by the compression unit so as to correspond to each other.

2. The image data compression device according to claim 1,
    wherein, when pixels having the values of the n bits matching between the first image data and the second image data continue, the compression unit generates the compressed data including the identification data and the number of pixels by which the pixels continue.

3. The image data compression device according to claim 1,
    wherein, when m>n, the compression unit generates the compressed data including the identification data and values other than the n bits of the gradation value of the corresponding pixel of the second image data.

4. The image data compression device according to claim 1,
    wherein the control unit detects movement of an image expressed by the first image data and the second image data and changes the corresponding pixels of the first image data and the second image data according to the detected movement.

5. An image data decompression device, comprising:
    a first memory that stores first image data indicating a gradation value of each of a plurality of pixels;
    a second memory that stores second image data after compression that indicates a gradation value of each of a plurality of pixels and that, for a pixel whose values of predetermined n bits match a gradation value of a corresponding pixel of the first image data, includes identification data indicating that the values of the n bits match each other; and
    a decompression unit that reads the first image data from the first memory and reads the second image data from the second memory and decompresses the second image data and that outputs an m-bit (where m≥n) gradation value using the values of the n bits of the corresponding pixel of the read first image data when the identification data is read.

6. The image data decompression device according to claim 5,
    wherein, when compressed data including the identification data and the number of pixels by which pixels having the values of the n bits matching between the first image data and the second image data continue is read, the decompression unit outputs gradation values of pixels of the number of pixels in m bits using the gradation value of the corresponding pixel of the first image data.

7. The image data decompression device according to claim 5,
wherein, assuming that m>n, when compressed data including the identification data and values of (m−n) bits is read, the decompression unit outputs an m-bit gradation value using the values of the n bits of the corresponding pixel of the first image data and the values of the (m−n) bits included in the compressed data.

8. A display device, comprising:
a first memory that stores first image data indicating a gradation value of each of a plurality of pixels;
a second memory that stores second image data after compression that indicates a gradation value of each of a plurality of pixels and that, for a pixel whose values of predetermined n bits match a gradation value of a corresponding pixel of the first image data, includes identification data indicating that the values of the n bits match each other;
a decompression unit that reads the first image data from the first memory and reads the second image data from the second memory and decompresses the second image data and that outputs an m-bit (where m≥n) gradation value using the values of the n bits of the corresponding pixel of the read first image data when the identification data is read; and
a display unit that displays an image according to the gradation value of each of the pixels expressed by the first image data and the second image data and the gradation value of the second image data decompressed by the decompression unit.

9. An image processing system, comprising:
a comparison unit that, when first image data and second image data in which a gradation value of each of a plurality of pixels is expressed in m bits are input, compares gradation values of corresponding pixels of the input first image data and second image data;
a compression unit that compresses the second image data and that, when values of predetermined n bits (where n≤m) of the gradation values match each other in a comparison result of the comparison unit, generates compressed data including identification data indicating that the values of the n bits match each other;
a control unit that performs control to output data, which indicates the gradation value of the corresponding pixel of the first image data, and the compressed data generated by the compression unit so as to correspond to each other;
a first memory that stores first image data including the data indicating the gradation value output from the control unit;
a second memory that stores second image data that is second image data after compression by the compression unit and includes the compressed data output from the control unit; and
a decompression unit that reads the first image data from the first memory and reads the second image data after compression from the second memory and decompresses the second image data after compression and that outputs an m-bit gradation value using the values of the n bits of the corresponding pixel of the read first image data when the identification data included in the compressed data is read.

10. The image processing system according to claim 9, further comprising:
a data amount storage unit that, when the comparison unit compares the values of the n bits in units of a partial region of an image expressed by the first image data and the second image data, stores the amount of the compressed data for each partial region,
wherein the decompression unit decompresses the second image data after compression for each partial region on the basis of the amount of data stored in the data amount storage unit.

11. An image data compression method, comprising:
when first image data and second image data in which a gradation value of each of a plurality of pixels is expressed in m bits are input, comparing gradation values of corresponding pixels of the input first image data and second image data;
compressing the second image data and, when values of predetermined n bits (where n≤m) of the gradation values match each other in a comparison result, generating compressed data including identification data indicating that the values of the n bits match each other; and
performing control to output data, which indicates the gradation value of the corresponding pixel of the first image data, and the generated compressed data so as to correspond to each other.

12. An image data decompression method, comprising:
reading, from a first memory that stores first image data indicating a gradation value of each of a plurality of pixels, the first image data;
reading second image data from a second memory that stores the second image data after compression that indicates a gradation value of each of a plurality of pixels and that, for a pixel whose values of predetermined n bits match a gradation value of a corresponding pixel of the first image data, includes identification data indicating that the values of the n bits match each other; and
decompressing the second image data and outputting an m-bit (where m≥n) gradation value using the values of the n bits of the corresponding pixel of the read first image data when the identification data is read.

* * * * *